Patented Mar. 2, 1937

2,072,303

UNITED STATES PATENT OFFICE 2,072,303

ARTIFICIAL THREADS, BANDS, TUBES, AND THE LIKE FOR SURGICAL AND OTHER PURPOSES

Willy O. Herrmann, Munich, Fritz Hammer, Bezirk Kassel, Hessen, and Wolfram Haehnel, Munich, Germany, assignors, by mesne assignments, to Chemische Forschungsgesellschaft m. b. H., Munich, Germany, a corporation of Germany No Drawing. Application October 14, 1933, Serial No. 693,675. In Germany October 17, 1932

9 Claims. (Cl. 128—335.5)

This invention relates to the production of threads, bands, tubes and other film-like articles of the type used by surgeons for closing or draining wounds, or for medical capsules and numerous other purposes in medical and non-medical arts.

The principal object of the invention is to provide an efficacious substitute in surgical, medical and other arts for the common forms of catgut, silkwormgut, silk, linen, celluloid yarn, horsehair and the like, and especially to provide threads, bands, tubes and other formed articles which may be used in the human or animal system without causing suppuration or fistular formation and which possess other desirable physical and chemical properties superior to the catgut, silkwormgut, etc. which they are intended to replace.

For many years catgut has been considered the best available material for surgical closings and has been widely used in the form of threads for internal stitching, buttons for joining intestines, tubes for draining wounds, etc., although it is well known that there are serious objections to its use in the human or animal system. For one thing, raw catgut, like its less efficient substitutes, is very difficult to sterilize and requires careful handling to guard against subsequent contamination. Furthermore, every competent surgeon knows that the body treats catgut as a foreign substance and attempts to reject it, causing suppuration and fistular formations which frequently result in the death of the patient. Silkwormgut, silk and other materials have been used to a limited extent in surgery but they have not replaced catgut because they possess the same and sometimes additional disadvantages, such as lack of tensile strength and resistance to fracture.

Recently Herrmann, Baum and Haehnel in application Serial No. 596,570, filed March 3, 1932, disclosed threads, bands, tubes and other articles made of polymerized vinyl alcohol which are far superior to previously known materials for surgical, medical and other purposes. Important advantages of the said polymerized vinyl alcohol articles are that they are endured by the body without causing suppuration and fistular formation, they are easily sterilized and remain sterilized, they possess great tensile strength and resistance to fracture, and may be made more or less resorptive as required.

Now, after exhaustive research we have discovered that certain other materials, especially other polyvinyl compounds and mixtures of polyvinyl compounds, possess all the above characteristics of polymerized vinyl alcohol as well as other advantages hereinafter described. We have discovered, for example, that threads, etc., made of esters, ethers or acetals of polyvinyl alcohol, or of the products of the partial saponification of such esters or acetals, or of esters of polyacrylic acid or polyitaconic acid or of polystyrols, are retained by the body without causing suppuration or fistular formation.

As a result of our discovery it is possible to select one or more members of the polyvinyl compound group, each having some particular property which makes it desirable for the purpose in hand; and to produce from the selected compound or compounds, sometimes in combination with other substances hereinafter described, sterile, germ-free threads, bands, tubes and other formed articles whose physical and chemical properties may be determined in advance to fit any surgical, medical or other need. Thus our invention not only contemplates mixtures of various polyvinyl compounds, but also mixtures of polyvinyl compounds with other substances, for example conversion products of polyvinyl acetate with sulfo salicyclic acid and other sulfonic acids.

Although reabsorbability is not requisite or desirable in all instances, for example in some threads used for surgical purposes, it is nevertheless very important that polyvinyl bodies which are not at all reabsorbable or not sufficiently reabsorbable in themselves be given an optionally graduated degree of reabsorbability through suitable additions and by properly proportioning such additions. A specific effect is obtained by the addition of reabsorbable substances which are soluble in water, such as gelatine, gums, sugars and the like or substances which are disintegrated by fermentation into substances soluble in water, such as albuminous matter, starches and the like. Additions of electrolytes are especially suited for increasing the reabsorbability of the product. Organic acids such as oxalic acid, malic acid and the like are effective, and especially those substituted with negative or positive residues. Thus sulfo salicyclic acid, benzol sulfonic acid, toluol sulfonic acid, tri-chlor acetic acid, glycocoll and aspartic acid are very effective. So also is phenyl hydrazine chlorhydrate. Inorganic electrolytes such as borax, nickel nitrate, potassium bichromate and others also promote reabsorbability.

For example, in order to promote resorption of polyvinyl acetate, sulfo salicyclic acid or benzol sulfonic acid may be added thereto. Resorption of the polyacrylic acid ester may be promoted by the addition of sulfo salicyclic acid. The non- or insufficiently reabsorbable modifications of polyvinyl alcohol are made more easily reabsorbable through the incorporation of p-toluol sulfonic acid, benzolsulfonic acid, sulfo salicylic acid, tri-chlor acetic acid or phenyl hydrazine chlorhydrate. In general a small percentage is sufficient as addition, for example 5 to 10%. By properly proportioning the addition the reabsorbability of the product may be optionally graduated. If the reabsorbability is too great the quantity of addition is reduced, and vice versa. The reabsorption-promoting substances, as well as the other additions hereinafter referred to, may be added under suitable circumstances to the initial material serving for the production of the polyvinyl compound. For instance, if threads are produced from free or partly estered or acetalized polyvinyl alcohol by spinning solutions of esters or acetals and by subsequently saponifying the threads so obtained, the additions may be made to the solutions to be spinned if necessary or desirable.

If necessary for any particular purpose, the strength of the threads, bands, tubes, etc., of polyvinyl compounds may be increased. This may be accomplished by the addition of suitable electrolytes such as sulfo cyanogen compounds among which potassium or ammonium rhodanide may be cited by way of example. A very considerable strengthening is also obtained by the addition of sugars, such as glucose, dextrine, etc. The mechanical strength of polyvinyl alcohol threads, for example, may be increased by the addition of rhodanides and also by the addition of glucose or borax, or by the simultaneous addition of such substances. Here also the addition may amount to 5 to 10% although the quantity of the addition will of course vary according to the result desired.

Various other materials may also be added to the polyvinyl compounds to give the product a bactericidal effect. Any suitable bactericidal substance may be used for this purpose. Among others may be mentioned the esters of aromatic acids such as propylbenzoate; salts or compounds or salt solutions of metals such as silver, mercury, bismuth, arsenic, etc.; also sulphur compounds and many other substances with bactericidal properties. For example, polyvinyl alcohol and polyvinyl acetate take on strongly bactericidal properties by the addition of propylbenzoate or chloride of mercury. Small quantities of these materials are usually sufficient, the exact quantity depending upon the bactericidal effect to be produced.

The chief application of our invention is in the field of surgery, for example in making threads for sewing and internal stitching, buttons for the joining of intestines, tubes for stitches in nerves and for draining wounds, in all of which the inability of the product to cause suppuration and fistular formation is of prime importance. This is a characteristic of all forms of the invention, the resorptive form being readily absorbed by the human or animal system without injurious results. Another important characteristic of the invention, the ability to incorporate in the product any desired degree of reabsorbability and any desired therapeutic property, makes it particularly useful in the manufacture of capsules, pills, suppositories and the like. Our products, whose characteristics may be modified at will as stated, are also useful in other fields. For example, the threads are suitable for the production of hygrometers, fabrics for making special clothing, etc. In many situations it may be advantageous to add water-resisting substances, softening materials, fillers, dyes, etc., to the polyvinyl compounds for specific purposes, any or all of which additions may be made without departing from the scope and spirit of our invention.

The invention is furthermore not limited to the production of threads, bands or tubes, or to any of the other articles which are cited herein by way of example. Articles prepared according to our invention may be formed in various ways as by forming a viscous solution or paste by dissolving or soaking the polyvinyl compounds in a suitable solvent. From such solutions or pastes, threads, bands, tubes, etc., can easily be made, for example by causing a solution or paste of the proper viscosity or temperature to form drops from which threads are made. This may be accomplished by placing the solution or paste in a container having a perforated bottom. Or the solution or paste may be forced through nozzles and the expressed threads may, if desired, be treated according to the processes used in the manufacture of artificial silk, such as stretching the thread, influencing the evaporation of the solvent, using a precipitate bath, etc. The solidification of the protruding threads and the like can be promoted by chilling to low temperatures. In general, it is recommended that relatively highly concentrated solutions or pastes be used, with increased temperature and pressure according to the viscosity. However, for the purpose of obtaining resorptive threads, the process may be carried out at low temperatures.

The invention claimed is:

1. Formed surgical and medical articles for use in the human or animal system which, when sterile, are incapable of causing suppuration and fistular formation, comprising at least one member selected from the group consisting of the esters, ethers and acetals of polyvinyl alcohol, the esters of polyacryl acid and polyitaconic acid and polystyrols.

2. Formed surgical and medical articles for use in the human or animal system which, when sterile, are incapable of causing suppuration and firstular formation, comprising a member selected from the group consisting of the esters, ethers and acetals of polyvinyl alcohol, the esters of polyacrylic acid and polyitaconic acid, and polystyrols and a soluble resorptive material selected from the group consisting of gelatine, gum, sugar, albuminous matter, starch, dextrine, oxalic acid, malic acid, lactic acid, sulfo salicylic acid, benzol sulfonic acid, toluol sulfonic acid, tri-chlor acetic acid, glycocoll, aspartic acid, phenyl hydrazine chlorhydrate, and solutions of borax, nickel nitrate and potassium bichromate.

3. Formed surgical and medical articles for use in the human or animal system which, when sterile, are incapable of causing suppuration and fistular formation comprising a member selected from the group consisting of the esters, ethers and acetals of polyvinyl alcohol, the esters of polyacrylic acid and polyitaconic acid, and polystyrols and a material increasing the strength of said articles.

4. Formed surgical and medical articles for use in the human or animal system which, when sterile, are incapable of causing suppuration and fistular formation, comprising a member selected from the group consisting of the esters, ethers and acetals of polyvinyl alcohol, the esters of polyacrylic acid and polyitaconic acid, and polystyrols and a bactericidal substance.

5. Formed surgical and medical articles for use in the human or animal system which, when sterile, are incapable of causing suppuration and fistular formation, comprising a member selected from the group consisting of the esters, ethers and acetals of polyvinyl alcohol, the esters of polyacrylic acid and polyitaconic acid, and polystyrols and a therapeutically acting substance.

6. Formed surgical and medical articles for use in the human or animal system which, when sterile, are incapable of causing suppuration and fistular formation, comprising at least one material selected from the group consisting of esters, ethers and acetals of polyvinyl alcohol, the esters of polyacrylic acid and polyitaconic acid and polystyrols, and a soluble material which increases the reabsorbability of said first material.

7. Formed surgical and medical articles for use in the human or animal system which, when sterile, are incapable of causing suppuration and fistular formation, comprising at least one material selected from the group consisting of esters, ethers and acetals of polyvinyl alcohol, the esters of polyacrylic acid and polyitaconic acid and polystyrols, and from 5 to 10% of a soluble material which increases the reabsorbability of said first material.

8. Formed surgical and medical articles for use in the human or animal system which, when sterile, are incapable of causing suppuration and fistular formation, comprising at least one material selected from the group consisting of esters, ethers and acetals of polyvinyl alcohol, the esters of polyacrylic acid and polyitaconic acid and polystyrols, and a water soluble electrolyte.

9. Formed surgical and medical articles for use in the human or animal system which, when sterile, are incapable of causing suppuration and fistular formation, comprising a mixture of polyvinyl alcohol and at least one material selected from the group consisting of the esters, ethers and acetals of polyvinyl alcohol, the esters of polyacrylic acid and polyitaconic acid, and polystyrols.

WILLY O. HERRMANN.
FRITZ HAMMER.
WOLFRAM HAEHNEL.